United States Patent
Arnold et al.

(10) Patent No.: US 7,792,880 B2
(45) Date of Patent: Sep. 7, 2010

(54) METHOD AND APPARATUS FOR EFFICIENT IMPLEMENTATION OF DISCONTIGUOUS OBJECTS

(75) Inventors: Matthew Arnold, Ossining, NY (US); David Francis Bacon, Sleepy Hollow, NY (US); Perry Cheng, New City, NY (US); Vadakkedathu Thomas Rajan, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 664 days.

(21) Appl. No.: 10/751,788

(22) Filed: Jan. 5, 2004

(65) Prior Publication Data

US 2005/0149346 A1    Jul. 7, 2005

(51) Int. Cl.
G06F 17/30 (2006.01)
G06F 12/00 (2006.01)

(52) U.S. Cl. .................................. 707/817; 711/170
(58) Field of Classification Search ............... 707/3, 707/100, 206, 104.1, 999.206, 999.204; 711/200, 711/100, 170
See application file for complete search history.

(56) References Cited

U.S. PATENT DOCUMENTS

| | | | | |
|---|---|---|---|---|
| 5,355,483 | A * | 10/1994 | Serlet | 711/154 |
| 5,561,786 | A * | 10/1996 | Morse | 711/170 |
| 5,799,324 | A * | 8/1998 | McNutt et al. | 1/1 |
| 5,835,958 | A * | 11/1998 | Long et al. | 711/170 |
| 5,845,296 | A * | 12/1998 | Jasuja et al. | 707/205 |
| 5,903,900 | A * | 5/1999 | Knippel et al. | 1/1 |
| 5,930,807 | A * | 7/1999 | Ebrahim et al. | 1/1 |
| 6,049,810 | A * | 4/2000 | Schwartz et al. | 1/1 |
| 6,105,103 | A * | 8/2000 | Courtright et al. | 711/1 |
| 6,115,782 | A * | 9/2000 | Wolczko et al. | 711/100 |
| 6,308,185 | B1 * | 10/2001 | Grarup et al. | 1/1 |
| 6,363,468 | B1 * | 3/2002 | Allison | 711/173 |
| 6,463,503 | B1 * | 10/2002 | Jones et al. | 711/114 |
| 6,490,664 | B1 * | 12/2002 | Jones et al. | 711/154 |
| 6,594,749 | B1 * | 7/2003 | Czajkowski | 711/170 |
| 6,839,826 | B2 * | 1/2005 | Cernea | 711/202 |
| 7,174,354 | B2 * | 2/2007 | Andreasson | 1/1 |
| 7,231,412 | B2 * | 6/2007 | Hitz et al. | 1/1 |
| 7,287,131 | B1 * | 10/2007 | Martin et al. | 711/154 |
| 2003/0014607 | A1 * | 1/2003 | Slavin et al. | 711/170 |
| 2003/0065899 | A1 * | 4/2003 | Gorobets | 711/165 |
| 2003/0126352 | A1 * | 7/2003 | Barrett | 711/100 |
| 2004/0139273 | A1 * | 7/2004 | Doucette et al. | 711/100 |

* cited by examiner

*Primary Examiner*—Hosain T Alam
*Assistant Examiner*—Eliyah S Harper
(74) *Attorney, Agent, or Firm*—Michael J. Buchenhorner; Vazken Alexanian (57) ABSTRACT

A garbage collection system that needs to meet real-time requirements breaks large objects that need to be moved into a series of arraylets. The arraylets are sized such that the amount of time required to move the arraylets is bounded by a predetermined amount. The arrays are preferably uniformly represented in the header for each array with a series of arraylet pointers that indicate the location of the arraylets. Control-flow graph splitting is used to eliminate multiple tests and allow common sub-expression elimination. Strip-mining can also be used to improve the efficiency of the process.

14 Claims, 8 Drawing Sheets

FIG. 5(a)  Non-uniform Array Layout

FIG. 5(b)  Uniform Array Layout

600

```
iaload(array, index)
    lfield = array.length
    byteindex = index << 2
    length = BitClear(lfield, 31)
    trap if (index < 0 || index >= length)
    if (lfield < 0)
            arraylet = (byteindex >> SHIFT) << 2
            array = array[arraylet]
            byteindex = byteindex & MASK
    return array [byteindex]
```

FIG. 6(a) Non-uniform Array Access

602

```
iaload(array, index)
    lfield = array.length
    byteindex = index << 2
    length = BitClear(lfield, 31)
    trap if (index < 0 || index >= length)
    if (lfield < 0)
            arraylet = (byteindex >> SHIFT) << 2
            arraylet = -12 – arraylet
            array = array[arraylet]
            byteindex = byteindex & MASK
    return array [byteindex]
```

FIG. 6(b) Uniform Array Access

METHOD AND APPARATUS FOR EFFICIENT IMPLEMENTATION OF DISCONTIGUOUS OBJECTS

CROSS-REFERENCE TO RELATED APPLICATIONS

This application relates to technology similar to that discussed in U.S. patent application Ser. Nos. 10/751,789 and 10/751,595, which are assigned to the same assignee as the present application.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of computer memory management. More particularly, the present invention relates to a method and apparatus for handling the moving of arrays in a memory in a system running a real-time application.

BACKGROUND OF THE INVENTION

With regard to computers, garbage collection refers to a process of identifying unused areas of main memory storage. In accordance with an object oriented computing language, the computer executing the program allocates memory for each of the objects. A Java Virtual Machine (JVM) using the object oriented programming language Java allocates memory for the instantiation of the objects from a free memory area called a heap. Memory is allocated to, and freed from, the heap in blocks of one of a number of predetermined sizes. Eventually, when the objects are no longer being referenced by the program, the memory allocated for the created objects is reclaimed through a garbage collection process. The garbage collection process clears the objects from memory whereby the once allocated memory is again available for use. More particularly, a garbage collection process comprises automatically determining which blocks of memory can be freed, marking unused blocks as no longer needed by an application, collecting all of the unused blocks of memory at periodic intervals, returning the unused blocks to the heap and marking the blocks as free for use. Such a garbage collection process is often referred to as a mark-and-sweep process because unused portions of memory are marked as garbage during a mark phase and then removed from allocated memory in a sweep phase. Although the process of garbage collection frees memory it may be problematic in applications where its unpredictable consumption of processor time affects the running of the application. In addition, the constant allocating and freeing of blocks of memory tends to fragment the memory over time.

The exact garbage collection strategy used by an object oriented program will often vary depending on the type of system in which the program is executing. For example, in some JVM implementations, the garbage collector is a built-in component. In other applications, different garbage collectors may be plugged in for different circumstances. Many different algorithms have been employed in these different garbage collector implementations. For example, server applications in a multi-user multiprocessor environment tend to have a memory-use profile that differs from a desktop computer environment. Furthermore, embedded-Java devices such as cell phones and handheld devices have different memory-use profiles. A single garbage collector is typically designed to implement one particular strategy and cannot be modified "on-the-fly" to change its strategy. Therefore, a customized garbage collector must be typically be built into each programming instance depending upon the computer platform and operating environment in which the program is executing. On any given day, a particular set of garbage collection characteristics or garbage collection algorithm metrics will be better for one device but not for another device. For example, a device with a small amount of memory may require a very aggressive garbage collection routine whereas as a large server with lots of memory may permit a more relaxed approach. In each case, a different type of garbage collection algorithm is needed in order to adapt the performance of the garbage collector to the performance characteristics of the hardware platform. Therefore, what is needed is a garbage collection process that can be easily be tuned for a variety of particular applications.

There are several common techniques for garbage collection. One technique is referred to as copying and relates to logically dividing the memory in half and using only one half of the memory at a time. During garbage collection, the collection routine copies all used objects to the other half of the memory. Following the copying of all the used objects, the memory manager adds the entire first half of memory to the free list. Consequently, the previously used memory which contained both the used objects and the garbage objects becomes free memory. In other words, the garbage filled memory has been reclaimed for later use. Another garbage collection technique is the mark-and-sweep method. The mark-and-sweep technique marks all used objects of memory. Each memory object usable by a program application is marked as used by the garbage collector. The garbage collector then sweeps the entire heap to reclaim all unmarked objects of memory by adding the unmarked objects to the free list. When the sweep phase is complete, all garbage objects are now on the free list and available to be reallocated to a computer program.

In some instances, the mark-and-sweep technique might be preferred over the copying technique because it is faster than copying, since the copying of objects and updating the references takes more time than adding a garbage block to a free list. Moreover, the mark-and-sweep technique is often more efficient since it uses the whole memory, as opposed to only half, as used in the copying technique. However, in other situations, the copying technique may be preferred due to the lack of fragmentation and in instances having a relatively small number of reached memory blocks.

Unfortunately, the mark-and-sweep technique has disadvantages. One such disadvantage is that the sweep function of the mark-and-sweep technique examines every single memory block. This is time consuming if the number of used objects is low relative to the number of objects allocated. In particular, some applications such as anti-lock brake management system are real time applications in that they require that a primary application never stop running. In such an application, it is important that the amount of processor time and memory devoted to garbage collection not interrupt the running of the application or mutator. In addition, it is important that the memory not be fragmented to the point that a certain level of memory is not available for the primary application.

Unfortunately, prior art garbage collection routines cannot guarantee a given level of performance. Therefore, what is needed is a real time garbage collection algorithm with guaranteed performance that allows for managed defragmentation of the memory.

SUMMARY OF THE INVENTION

An application of the present invention is directed toward a method of moving arrays as part of a garbage collection process. In accordance with the method, a maximum array size to be allocated from a heap is determined. Arrays above the maximum array size are divided into a series of arraylets. At least some of the arraylets are allocated in the heap in a discontiguous manner. The arrays below the maximum array size are allocated in the heap in a contiguous manner. Arrays above and below the maximum array size are preferably represented in a uniform manner. In such an embodiment, arraylet pointers are part of a header for all arrays. In an alternative embodiment, arrays above and below the maximum array size are represented in an non-uniform manner. In this embodiment, the arrays divided into the arraylets are represented by replacing array data with a list of arraylet pointers. Opportunistic contiguous allocation is utilized whereby an attempt is made to allocate all arrays contiguously and an array is only divided into arraylets if the array cannot be allocated contiguously. Control-flow graph splitting is used to eliminate multiple tests and allow common sub-expression elimination. The garbage collection process is interleaved on a time-based schedule with a real-time application.

Another application of the present invention is directed toward a method of allocating arrays in a heap. In accordance with the method, arrays above a certain size are divided into smaller arraylets. At least some of the arraylets are allocated to the heap in a discontiguous manner. In the preferred embodiment, arrays above and below the certain size are represented in a uniform manner such that arraylet pointers are part of a header for all arrays. The method also preferably determines if the array can be allocated contiguously and only divides the array into arraylets if the array cannot be allocated contiguously. Control-flow graph splitting is used to eliminate multiple tests and allow common sub-expression elimination. The allocation is performed as part of a garbage collection process that is interleaved on a time-based schedule with a real-time application.

Yet another application of the present invention is directed toward software for allocating memory as part of a garbage collection process for a real-time application. The software includes instructions for determining if an array to be allocated from the memory is above a certain size. The software divides an array into a series of arraylets if the array is above the certain size and allocates the arraylets from the memory. The size of the arraylets is selected such that the arraylets can be moved within a given quantum of time. Preferably, the software determines if an array above the certain size can be allocated contiguously in the memory and only divides the array into the arraylets if the array cannot be allocated contiguously in the memory. Arraylet pointers are preferably included as part of a header for the arrays. Alternatively, the arrays divided into the arraylets may be represented by replacing array data with a list of arraylet pointers. Control-flow graph splitting software eliminates multiple tests and allows common sub-expression elimination. The software can attempt to make all the arrays contiguous during a defragmentation process.

DETAILED DESCRIPTION

A collector constructed in accordance with a preferred embodiment of the present invention will provide guaranteed performance provided the application is correctly characterized by the user. In particular, the user must be able to specify the maximum amount of simultaneous live data, m, as well as the peak allocation rate over the time interval of a garbage collection $a^*(\Delta GC)$. The collector is parameterized by its tracing rate R. Given these characteristics of the mutator and the collector, the user then has the ability to tune the performance of the system using three interrelated parameters: total memory consumption, minimum guaranteed CPU utilization and the resolution at which the utilization is calculated.

Figure 1:
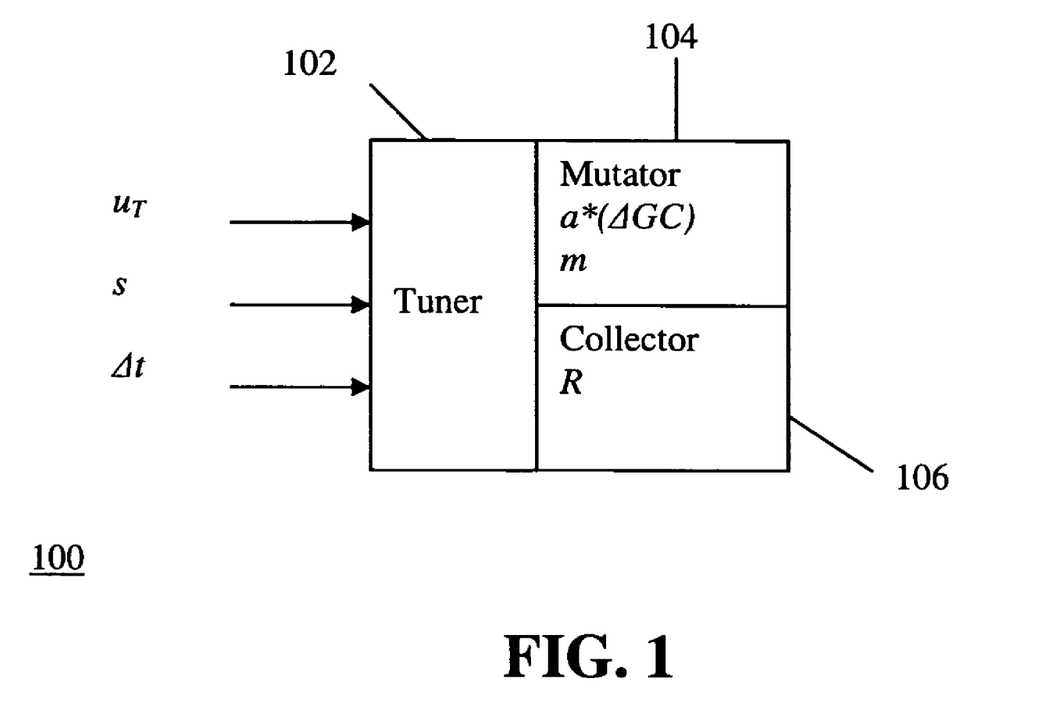
FIG. 1 is a diagram of the system parameters that can be used to tune the performance of an object oriented application in accordance with an embodiment of the present invention.

The relationship between these parameters is shown graphically in FIG. 1. The mutator 104 is characterized by its allocation rate over a garbage collection interval $a^*(\Delta GC)$ and by its maximum memory requirement m. The collector 106 is characterized by its collection rate R. The tunable parameters 102 are $\Delta t$, the frequency at which the collector is scheduled, and either the CPU utilization level of the application $u_T$ (in which case a memory size s is determined) or a memory size s which determines the utilization level $u_T$. By setting these parameters to limit CPU utilization and memory size, and using the defragmentation techniques set forth in more detail below, a garbage collection routine can be implemented in a real time application such as an automotive control system that has strict availability requirements.

Figure 2:
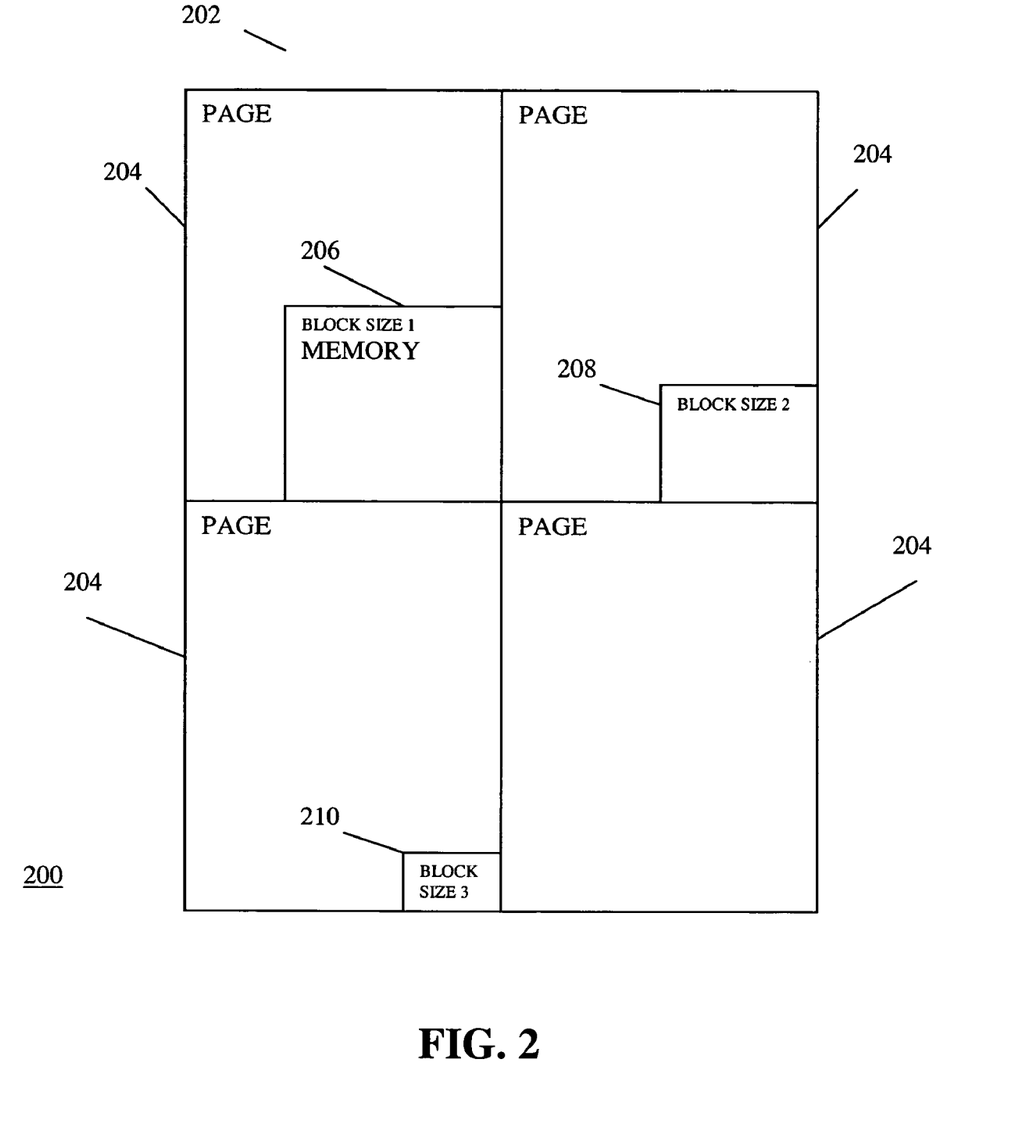
FIG. 2 is a diagram showing application of a method of dividing a memory into pages and block class sizes in accordance with an embodiment of the present invention.

Referring now to FIG. 2, a block diagram 200 shows a memory 202 divided in accordance with a preferred embodiment of the present invention. The memory 202 is divided into a series of pages 204 each of a size .PI. Each page 204 is divided into a number of fixed size blocks 206, 208 and 210 with a maximum block size 206 of .SIGMA. In a preferred embodiment, the page size, .PI., and the maximum block size, .SIGMA., are both powers of two. While the maximum block size is .SIGMA., a number, n, of smaller classes of block sizes are also created. Memory is allocated for objects from blocks of the smallest size class that will accommodate the object. Using a large number of block size classes with a relatively low ratio of adjacent class sizes reduces the amount of fragmentation as discussed in more detail below.

The total fragmentation of a system such as that shown in FIG. 2 can be categorized as one of three types. First, there is unused space at the end of each block which is referred to as internal fragmentation. Internal fragmentation is fundamentally expressed as a ratio between the inherent space required by live objects and the actual amount of space they consume. A ratio $\rho$ between the adjacent block sizes shown in FIG. 2 can be used to bound the amount of internal fragmentation. In particular, a preferred embodiment of the present invention uses a small ratio between adjacent block size classes because, even if fragmentation occurs, the blocks will be compacted and unused pages can be redistributed to other sizes. Thus, the internal fragmentation is limited to $\rho$ by selecting the block size classes such that adjacent size classes $c_i$ and $c_{(i-1)}$ satisfy the formula $c_i=c_{(i-1)}(1+\rho)$. The collector is, thus, adaptive in that it responds to the changing object size needs of an application. However, it will be appreciated that when the system is operating in the steady state, the distribution of object sizes is relatively constant and little defragmentation may actually be required.

Secondly, there is unused space at the end of a page which is referred to as page-internal fragmentation. The ratio of the page size to the largest block class size primarily determines the amount of page-internal fragmentation. More particularly, the amount of internal fragmentation is generally bound by the largest block size divided by the page size. Thus, the selection of the page size and the largest block size class may be used to bound the page-internal fragmentation for time or memory sensitive applications.

Finally, there are unused blocks that could satisfy a request for a different size object. This type of fragmentation is referred to as external fragmentation. External fragmentation only occurs on pages that have both live and dead objects. External fragmentation is often determined by the size of the objects being allocated by the application. Applications typically exhibit locality in that the number of objects of a particular size class that were allocated during a previous cycle is often a good predictor of the number of objects in the size class that will be allocated during the next cycle. External fragmentation is practically eliminated in accordance with an embodiment of the present invention by using arraylets or blocks whereby large arrays are broken into fixed-sized pieces. This bounds the potential external fragmentation caused by large objects. In addition, explicit defragmentation may be performed on pages containing dead objects as discussed in more detail herein.

A read barrier is preferably used to address the pages and blocks of the memory. A most preferred embodiment of the present invention uses a Brooks-style read barrier wherein each object contains a forwarding pointer that normally points to itself. However, when the object has been moved, the pointer points to the moved object. The memory is divided into a current area referred to as the from-space that is used by the processors during current program execution and a reserved area referred to as the to-space. Because the preferred embodiment uses a forwarding pointer, the collector maintains a to-space invariant. Thus, the mutator or application always sees the new version of an object. However, the sets comprising the from-space and to-space have a large intersection, rather than being completely disjoint as in a pure copying collector. While the preferred embodiment uses a read barrier and a to-space invariant, the collector does not suffer from variations in mutator utilization because all of the work of finding and moving objects is performed by the collector during the collection phase.

The read barrier can be either lazy or eager. A lazy barrier has the property that registers and stacks cells can point to either from-space or to-space objects and the forwarding operation is performed at the time of use. Conversely, an eager barrier maintains the invariant such that registers and stack cells always point into to-space. Thus, the forwarding operation is performed eagerly as soon as the quantity is loaded. Eager barriers have a major performance advantage in that if a quantity is loaded and then dereferenced many times, such as when a reference to an array of integers is loaded and then used in a loop, the eager barrier will only perform the forwarding operation once. A lazy barrier will perform the forwarding operation for every array access. The cost to using an eager barrier is that because the eager barrier is stricter it is more complex to maintain. Whenever the collector moves objects, it must find all outstanding register and stack cells and re-execute the forwarding operation on them.

Figure 3:
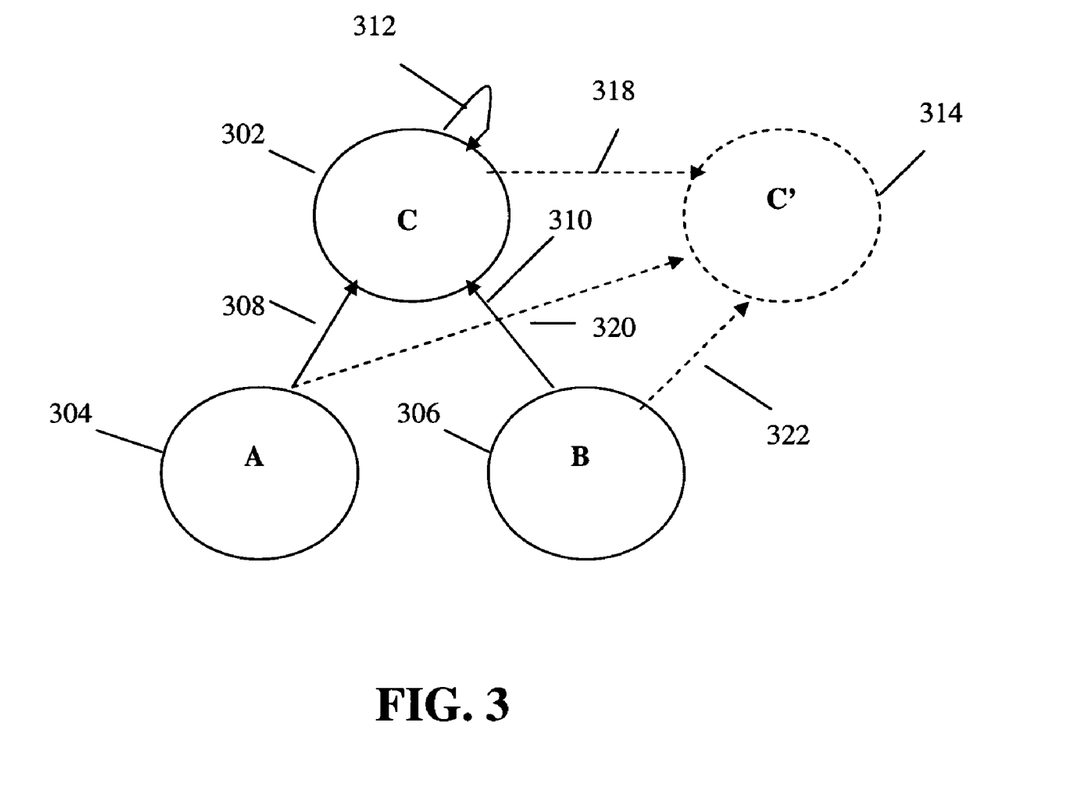
FIG. 3, is an illustration of a method of moving objects using a read barrier with a forwarding pointer in accordance with an embodiment of the present invention.

A preferred method 300 of moving of an object using a read barrier with a forwarding pointer in accordance with an embodiment of the present invention is described with respect to FIG. 3. The object to be moved C 302 is referenced by two applications A 304 and B 306 which have their respective pointers 308 and 310 pointing toward C 302. The forwarding pointer 312 in C 302 originally points to C 302 itself. To move the object C 302, a new block of memory C' 314 is first allocated for the object C 302. Once a new block of memory has been allocated, the content of C 302 is then moved into C' 314. The forwarding pointer 312 of object C 302 is then pointed 318 toward C' 314. Thus, if an application calls on object C 302, the forwarding pointer 318 redirects the application to C' 314. Finally, the pointers 308 and 310 from applications A 304 and B 306 are redirected, as shown by arrows 320 and 322 respectively, toward the new memory location for the object C' 314. Thus, the collector maintains a to-space invariant such that the mutator or application always sees the new version C' of the object C. Once the pointers 308 and 310 have been updated to pointers 320 and 322 to point to C' 314, the object C 302 is no longer referenced by an application. Thus, the object C 302 will be marked as unused or dead during the mark phase such that the memory blocks will be freed for future use as discussed in more detail below.

Figure 4:
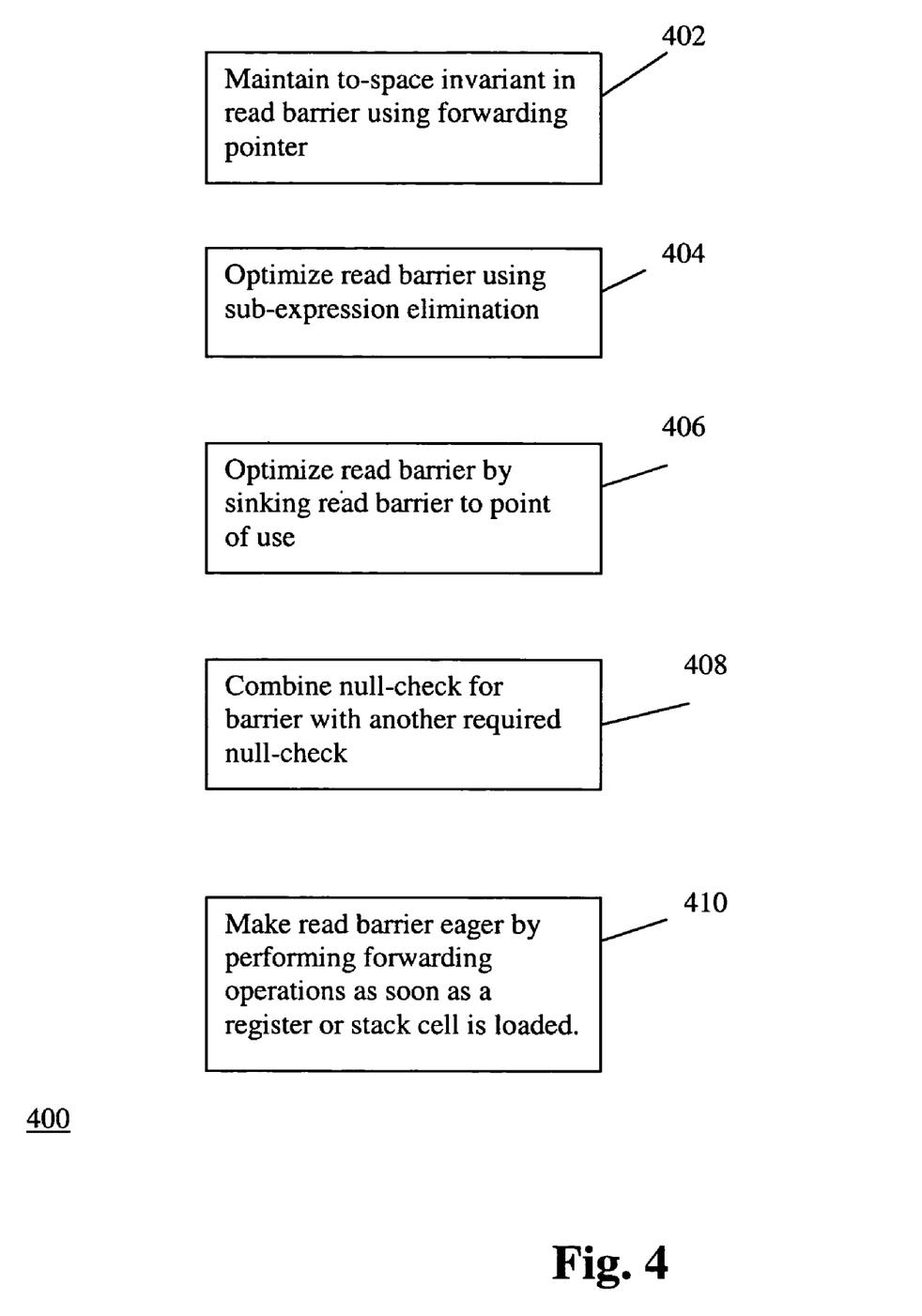
FIG. 4 is a list of a variety of techniques for minimizing problems that occurred with prior art read barriers in accordance with preferred embodiments of the present invention.

The read barrier of the present invention uses a variety of techniques 400 to minimize the problems that occurred with prior art read barriers as set forth in FIG. 4. For example, the read barrier maintains a to-space invariant in the read barrier using forwarding pointer as shown in step 402. However, the read barrier does not suffer from variations in mutator utilization because all of the work of finding and moving objects is performed by the collector. The preferred embodiment also overcomes the high software costs typically associated with read barriers by using an optimizing compiler wherein the compiler is able to optimize the barriers. A number of optimizations can be used to reduce the costs of the read barriers. Common sub-expression elimination 404, as well as other special purpose optimizations like barrier-sinking 406 in which the barrier is sunk down to its point of use are used. The use of optimizations allows the null-check required by the Java object dereference to be folded into the null-check required by the barrier 408. Since the pointer can be null, the barrier can not perform forwarding unconditionally. Optimization works with whatever null-checking approach is used by the run time system whether it is accomplished via explicit comparisons or implicit traps on null dereferences. The point is to usually avoid introducing explicit checks for null and the preferred embodiment guarantees that any exception due to a null pointer occurs at the same place as it would have in the original program. In addition, the read barrier is preferably an eager read barrier that performs forwarding operations as soon as a register or stack cell is loaded 410. As stated above, eager barriers have major performance advantages for real time applications.

Large objects pose special problems for garbage collectors. In copying collectors, if these are repeatedly copied, the performance penalty can be very high. In non-copying collectors, external fragmentation can make it impossible to allocate a large object. For example, a single small object in the middle of the heap can make it impossible to satisfy a request for an object slightly larger than half the heap. Furthermore, in incremental and real-time collectors, large objects pose an additional problem because they cannot be moved in a reasonably bounded amount of time.

According to a preferred embodiment of the present invention, a mostly non-copying collector is used to implement a novel approach. Short arrays of a predetermined length are represented as contiguous structures while long arrays are represented as two-level arrays comprising arraylets of size $\Sigma$ where $\Sigma$ is a power of two. Thus, the preferred embodiment has the advantage of never needing to allocate large objects contiguously and, therefore is not subject to prohibitive external fragmentation. Nevertheless, access to the array elements is still efficient and is as efficient as using a contiguous layout when used in conjunction with strip-mining optimizations. The arraylet size, $\Sigma$, is chosen in accordance with desired performance given a tradeoff. If the arraylet size is set sufficiently large, all non-array objects will be contiguous and the implementation is simplified. However, if the arraylet size is too large, the potential that a large object cannot be allocated from the heap is increased. In addition, the time bounds may not be acceptable for a real-time application.

Figure 5A:
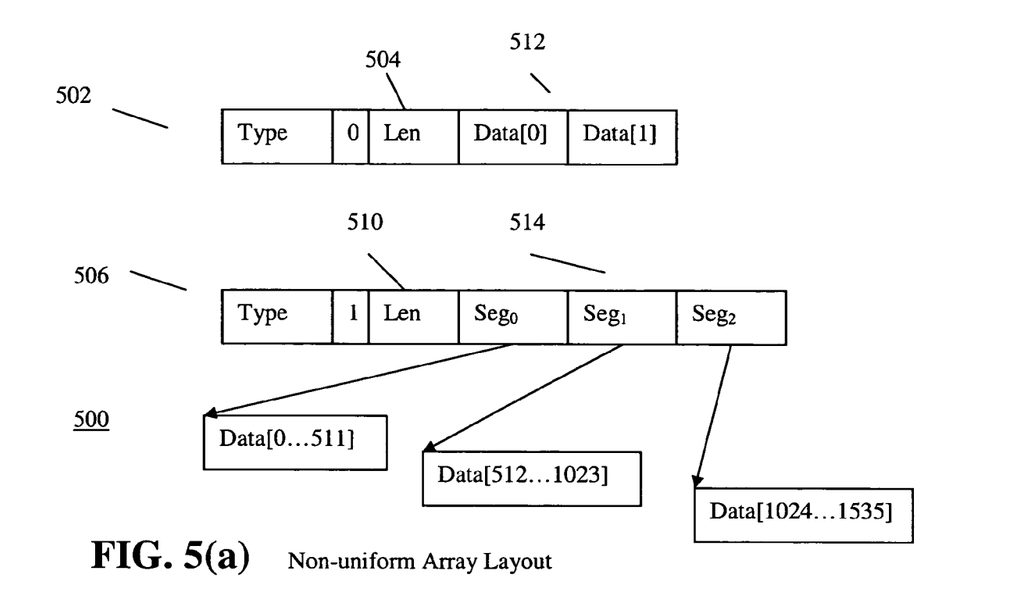
FIGS. 5(a) and 5(b) are illustrations of non-uniform and uniform array layouts for both segmented and unsegmented arrays in accordance with embodiments of the present invention.

Two different schemes can be used to implement the arraylets, a non-uniform array representation and a uniform array representation. Referring now to FIG. 5(a), a non-uniform system 500 for representing arraylets is shown. The representations for contiguous arrays 502 shorter than $\Sigma$ are unchanged. The high bit of the length field 504 is set to zero for such a short array 502. Segmented arrays 506 are represented by setting the high bit of the length field 510 to one. In addition, the array data 512 is replaced with a list of arraylet pointers 514. The final arraylet can be of any size to prevent fragmentation due to fixed-size arraylets.

The non-uniform method works well but may be problematic when used with optimizations. In particular, since the representation is non-uniform, unless the compiler can prove that an array is contiguous, it must generate code for both bases at each array access. This tends to yield a pattern of successive diamonds in the control-flow graph. Thus, in order to achieve good performance, control-flow graph splitting needs to be performed to eliminate multiple tests and allow common sub-expression elimination. However, control-flow graph splitting is problematic for the non-uniform representation scheme because, if there are n arrays in a loop, it may require $2^n$ versions of the loop to handle all of the difference combinations of contiguous and segmented arrays.

Figure 5B:
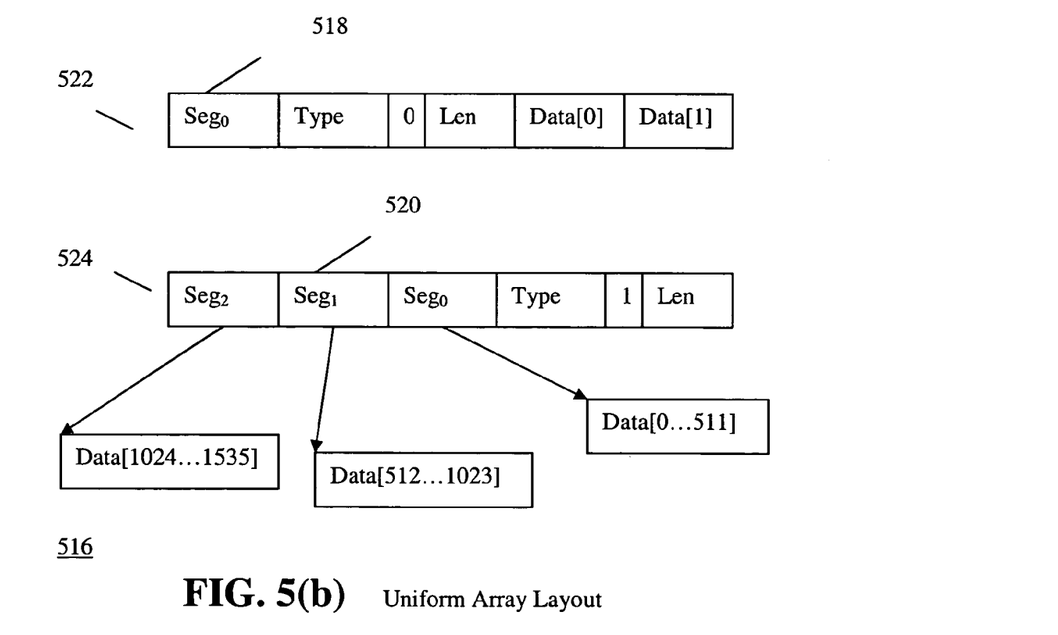

Due to the above discussed deficiencies in the non-uniform representation scheme, preferred embodiments of the present invention use an arraylet representation that is fully uniform 516 as shown in FIG. 5(b). The arraylet pointers 518 and 520 are now conceptually part of the header and exist for all arrays whether the arrays are contiguous 522 or segmented 524. When the array is contiguous 522, the arraylet pointer 518 simply points back to the beginning of the data area. When the array is non-contiguous 524, the arraylet pointers 520 point to the arraylets.

Figure 6A:
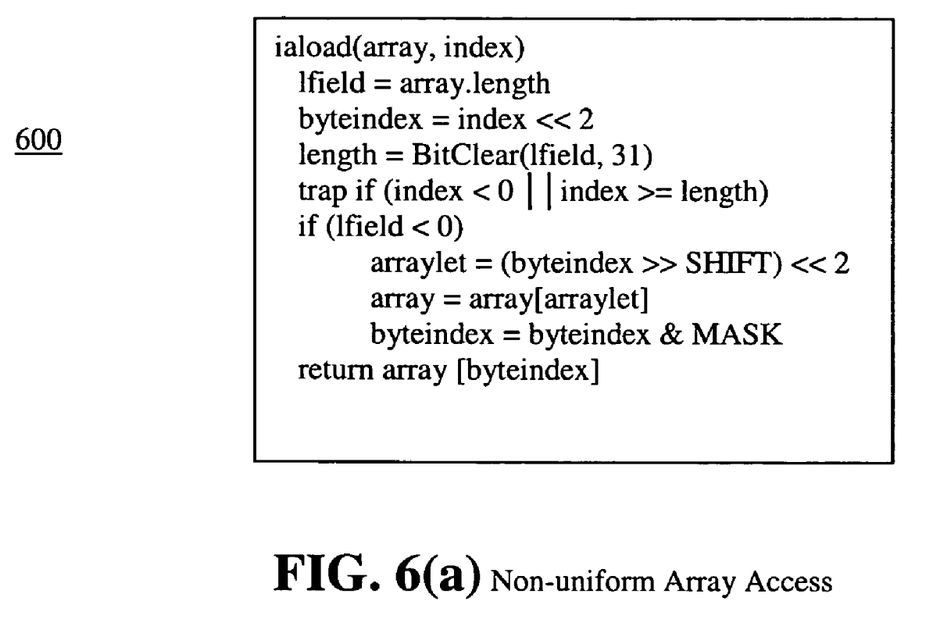
FIGS. 6(a) and (b) depict pseudo-code for implementing non-uniform and uniform array access in accordance with embodiments of the present invention.
Figure 6B:
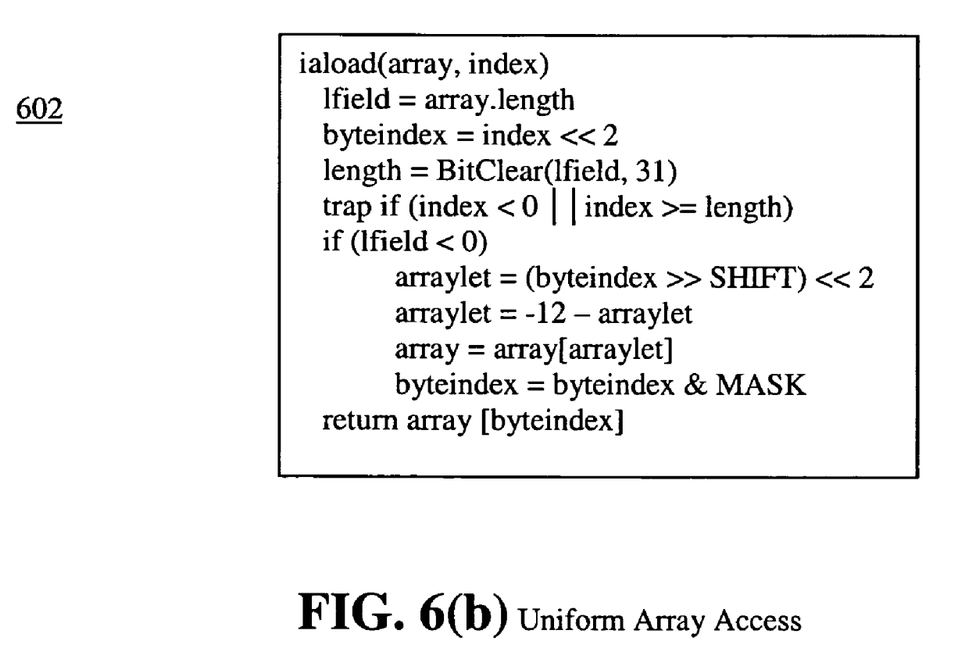

Assembler pseudo-code for non-uniform arraylet access 600 is set forth in FIG. 6(a) and assembler pseudo-code for uniform arraylet access 602 is set forth in FIG. 6(b). Like the code for the non-uniform arrays 600, the uniform code 602 tests whether the array is contiguous and if so uses a fast path for array access. When performing arraylet access, the uniform code 602 is slightly slower because it must perform negative indexing and jump past the object header. However, the major advantage of the uniform representation is that the conditional can always been dropped. Initially this leads to lower performance as contiguous array access is more expensive. However, it creates a structure that that is much easier for the optimizer to work with. There is only a single path in the control-flow graph, and since the arraylet calculations are not control-dependent, they can be merged by common sub-expression elimination. With the addition of strip-mining, it is possible to move arraylet base calculations entirely out of most inner loops.

The arraylet scheme can also use opportunistic contiguous allocation whereby it first attempts to allocate all arrays contiguously and only divides an array into arraylets if this cannot be accomplished. Allocation can also only be performed when an allocation would cause a segmented array table to grow. When performing defragmentation, discontinuous arrays can be made contiguous if possible to remove entries from the segmented array table. Also, if a large array needs to be moved, it can be moved at the beginning of a collection quantum so that it can finish moving before the end of the quantum. In such a case, it would appear to the mutator that the array was never segmented. If desired, code patching and thin guards can also be used to improve the systems performance.

Figure 7:
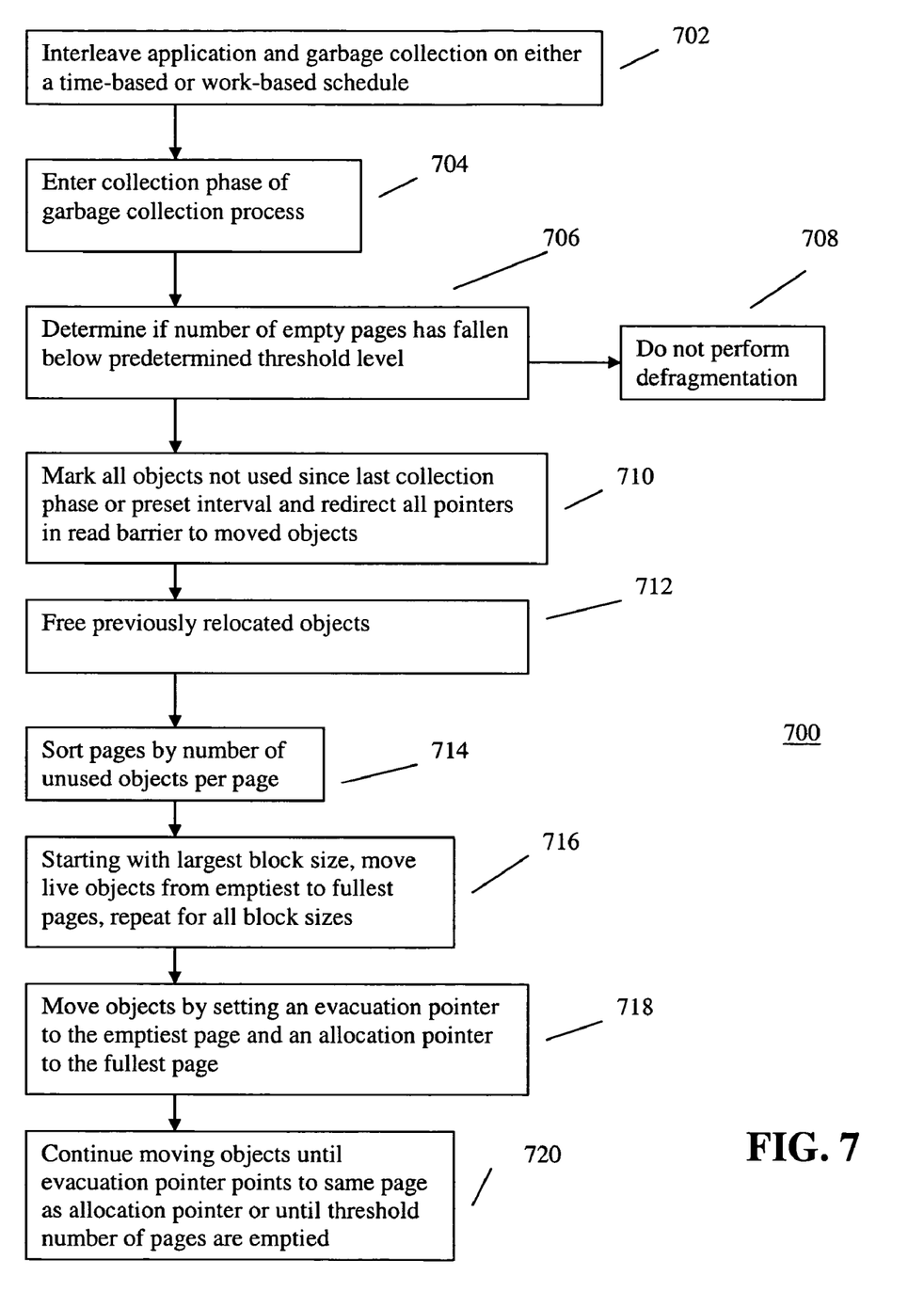
FIG. 7 is a flow chart for implementing a defragmentation process during a garbage collection phase in accordance with an embodiment of the present invention.

Referring now to FIG. 7 a preferred method 700 for accomplishing defragmentation during the collection phase of a garbage collection process is shown. In step 702, the application and garbage collection are interleaved on either a time-based or work-based schedule. Work-based algorithms may achieve short individual pause times but are typically unable to achieve consistent utilization. A work-based algorithm does a little garbage collection each time the mutator allocates memory. By keeping this interruption short, the work of collection is spread evenly throughout the application. Unfortunately, programs are not uniform in their allocation behavior over short time scales, rather they are bursty. As a result, work-based strategies suffer from very poor mutator utilization during such bursts of allocation. Time-based scheduling interleaves the collector and the mutator on a fixed schedule. These systems are quite stable and only require a small number of coarse parameters that describe the application's memory characteristics to function within well controlled space bounds.

Defragmentation occurs during the garbage collection phase as set forth in step 704. First, it is determined whether or not the number of empty pages of memory has fallen below a threshold number of empty pages of memory as shown in step 706. If the threshold has not been breached, the proceeds to step 708 wherein no defragmentation occurs during the present garbage collection phase. The threshold number of pages is selected such that there is always enough memory to run the primary real time application. If the threshold has been breached, the method proceeds to step 710 wherein all objects that have not be used since the last collection cycle are marked as unused objects. During the mark phase of the garbage collection process, the memory blocks for all of the objects that have been previously relocated during a previous collection process as described with respect to FIG. 2 are freed or released for future use as shown in step 712.

Once the objects have been marked as used or unused, the pages of memory are sorted according to the number of unused objects per page as shown in step 714. In one embodiment, the first entry in the list contains the page with the least number of dead or unused objects and the last entry contains the page with the greatest number of dead objects. In step 716, starting with the largest block size, live objects are moved from the pages having the most dead objects to pages having the least dead objects. After the largest block class sized objects have been moved, the process is repeated for each lower block size. The later smaller classes of blocks are used to fill in the holes left by the allocation of the larger earlier blocks. Thus, proceeding in this manner reduces the internal fragmentation of the heap. The objects are preferably moved by setting an evacuation pointer to the emptiest page and an allocation pointer to the fullest page in step 718. The process continues in step 720 until the evacuation pointer and the allocation pointer point to the same page or, alternatively, until the threshold number of pages has been emptied. The process then waits until the threshold is again violated at which time the garbage collection cycle begins again.

Figure 8:
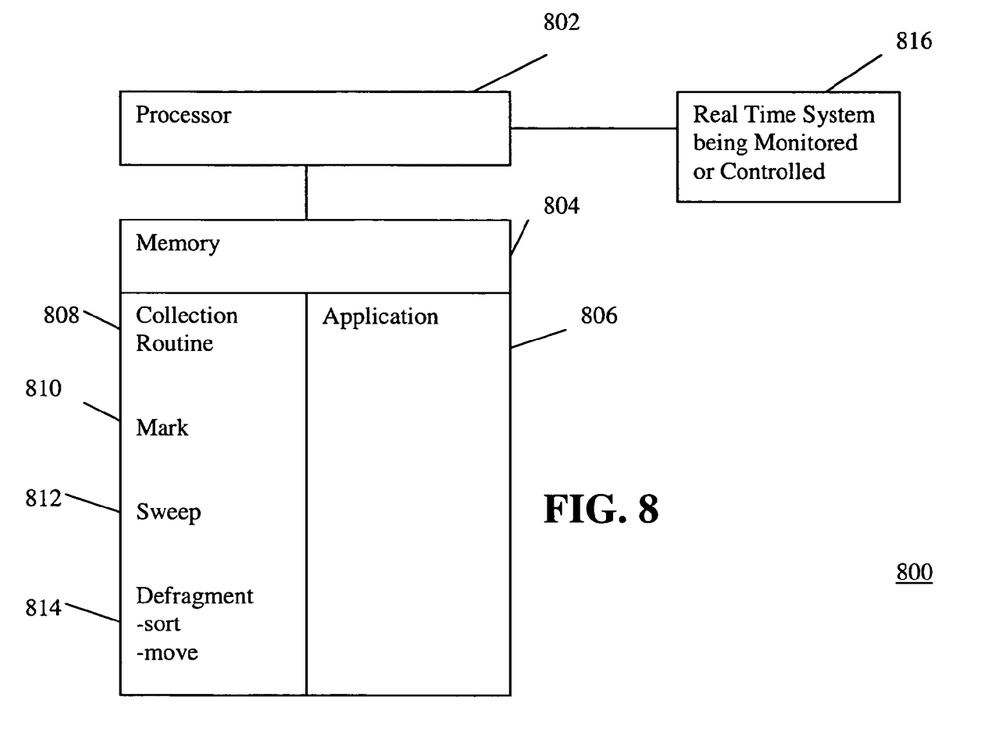
FIG. 8 is a diagram of an implementation of an embodiment of the present invention.

As shown in FIG. 8 a preferred embodiment 800 of the present invention can be implemented in software in a memory 804 that runs on a processor 802. The memory contains programming for an application 806 and a garbage collection process 808. A defragmentation routine 814 is inserted into a mark 810 and sweep 812 garbage collection routine 808 that functions as described in more detail above. The processor 802 interleaves the application 806 with the garbage collection process 808 having the mark 810, sweep 812 and defragmentation 814 routines. The garbage collection process 808 is bounded with respect to the time for collection and the overhead memory space required as described herein. Thus, the invention may be used to insure that an adequate amount of processor 802 capacity and memory is available to properly run the real time system 816 being controlled or monitored by the processor 802 and application software 806.

What has been shown and discussed is a highly-simplified depiction of a programmable computer apparatus. Those skilled in the art will appreciate that other low-level components and connections are required in any practical application of a computer apparatus. Therefore, while there has been described what is presently considered to be the preferred embodiment, it will be understood by those skilled in the art that other modifications can be made within the spirit of the invention.

What is claimed is:

1. A method of moving arrays as part of a garbage collection process, the method comprising:
   using a collector for entering a collection phase of a garbage collection process, wherein said garbage collection process is interleaved with a real-time application;
   using a mutator for:
      determining a maximum contiguous array size to be allocated from a heap, wherein the maximum contiguous array size is selected in accordance with desired performance levels;
      dividing arrays into long arrays and short arrays, wherein long arrays are arrays that are above the maximum contiguous array size, and short arrays are arrays that are below or equal to the maximum contiguous array size;
      representing the long arrays as two-level arrays by partitioning the long arrays into a series of arraylets, wherein arraylets comprise a size that is a power of two;
      allocating the short arrays below the maximum contiguous array size in a contiguous manner;
      using opportunistic contiguous allocation for allocating as many arraylets as possible in a contiguous manner;
      allocating a remainder of the arraylets in the heap in a discontiguous manner; and
      moving the arrays and arraylets into memory according to their allocation to maximize a number of contiguous memory blocks that are filled, such that array access is optimized and fragmentation is minimized.

2. The method of claim 1 comprising using opportunistic contiguous allocation whereby an array is only divided into arraylets if the array cannot be allocated contiguously.

3. The method of claim 1 wherein the garbage collection process is interleaved on a time-based schedule with the real-time application.

4. The method of claim 1 wherein arraylets comprise headers comprising arraylet pointers.

5. The method of claim 4 comprising utilizing control-flow graph splitting to eliminate multiple tests of contiguity and allow common sub-expression elimination.

6. The method of claim 1 wherein all arrays are represented in a non-uniform manner.

7. The method of claim 6 wherein the arrays divided into the arraylets are represented by replacing array data with a list of arraylet pointers.

8. A computer readable storage medium comprising program code that, when executed, enables a computer to perform steps of:
   entering a collection phase of a garbage collection process, wherein said garbage collection process is interleaved with a real-time application;
   determining a maximum contiguous array size to be allocated from a heap, wherein the maximum contiguous array size is selected in accordance with desired performance levels;
   determining if an array to be allocated from the memory is above the maximum contiguous array size;
   dividing the arrays into long arrays and short arrays, wherein the long arrays are the arrays that are determined to be above the maximum contiguous array size;
   representing the long arrays as two-level arrays by partitioning the long arrays into a series of arraylets, wherein the arraylets comprise a size that is a power of two;
   allocating the short arrays below the maximum contiguous array size in a contiguous manner;
   using opportunistic contiguous allocation for allocating as many of the arraylets as possible to the memory in a contiguous manner;
   allocating a remainder of the arraylets in a discontiguous manner; and
   moving the arrays and arraylets into memory according to their allocation to maximize a number of contiguous memory blocks that are filled, such that array access is optimized and fragmentation is minimized.

9. The storage medium of claim 8 comprising software for determining if an array above a certain size can be allocated contiguously in the memory and only dividing the array into the arraylets if the array cannot be allocated contiguously in the memory.

10. The storage medium of claim 8 comprising arraylet pointers as part of a header for the arrays.

11. The storage medium of claim 8 comprising control-flow graph splitting software for eliminating multiple tests and allowing common sub-expression elimination.

12. The storage medium of claim 8 wherein the long arrays divided into the arraylets are represented by replacing array data with a list of arraylet pointers.

13. The storage medium of claim 8 comprising software for attempting to make all arrays contiguous during a defragmentation process.

14. The storage medium of claim 8 wherein a size of the arraylet is selected such that the arraylet can be moved within a given quantum of time.

* * * * *